US012789746B2

(12) United States Patent
Chen et al.

(10) Patent No.: US 12,789,746 B2
(45) Date of Patent: Nov. 10, 2026

(54) SEAT BELT SUPPORT POINTS FORWARD AND BACKWARD ADJUSTMENT STRUCTURE

(71) Applicant: Adient (Chongqing) Automotive Components Co., Ltd., Chongqing (CN)

(72) Inventors: Zhiyong Chen, Chongqing (CN); Ming Zhang, Chongqing (CN); Ying Guan, Chongqing (CN); Yawei Liu, Chongqing (CN); Zhangneng Shi, Chongqing (CN)

(73) Assignee: Adient (Chongqing) Automotive Components Co., Ltd., Chongqing (CN)

( * ) Notice: Subject to any disclaimer, the term of this patent is extended or adjusted under 35 U.S.C. 154(b) by 111 days.

(21) Appl. No.: 18/931,247

(22) Filed: Oct. 30, 2024

(65) Prior Publication Data

US 2025/0136038 A1 May 1, 2025

(30) Foreign Application Priority Data

Oct. 30, 2023 (CN) ......................... 202322922789.3

(51) Int. Cl.

*B60R 22/20* (2006.01)
*B60N 2/02* (2006.01)
*B60N 2/20* (2006.01)

(52) U.S. Cl.

CPC ........ *B60R 22/201* (2013.01); *B60N 2/02258* (2023.08); *B60N 2/20* (2013.01); *B60R 2022/207* (2013.01)

(58) Field of Classification Search

CPC . B60R 22/201; B60R 22/06; B60R 2022/207; B60N 2/02258; B60N 2/20
USPC ................................ 297/362.11, 362.14, 363
See application file for complete search history.

(56) References Cited

U.S. PATENT DOCUMENTS

| | | | | |
|---|---|---|---|---|
| 5,022,677 A * | 6/1991 | Barbiero | B60R 22/06 | 297/483 |
| 11,584,335 B2 * | 2/2023 | Hammadi | B60R 22/26 | |
| 2011/0057432 A1 * | 3/2011 | You | B60R 22/20 | 280/804 |
| 2023/0097938 A1 * | 3/2023 | Kim | B60R 22/201 | 280/801.2 |

(Continued)

FOREIGN PATENT DOCUMENTS

| | | | |
|---|---|---|---|
| FR | 2888549 B1 * | 7/2005 | |
| WO | WO-2014093266 A1 * | 6/2014 | B60R 22/03 |

*Primary Examiner* — Jose V Chen
(74) *Attorney, Agent, or Firm* — Marshall & Melhorn, LLC

(57) ABSTRACT

A safety belt lower anchorage front-back adjustment structure may have a bottom base and a seat frame that is mounted on the bottom base. A support base may be respectively mounted on the bottom base at positions corresponding to a left side and a right side of the seat frame. A sliding component may be provided on each the support base. Two of the sliding components may be able to slide forward and backward on the corresponding support base. A driving assembly may be provided between the sliding component and the corresponding support base used for driving the sliding component to slide forward and backward among the two sliding components. A buckle may be fixedly mounted on one sliding component, and a lower anchor is fixedly mounted on the other sliding component.

12 Claims, 5 Drawing Sheets

(56) References Cited

U.S. PATENT DOCUMENTS

| | | | | |
|---|---|---|---|---|
| 2025/0058737 | A1* | 2/2025 | Jaradi | B60R 22/201 |
| 2025/0136037 | A1* | 5/2025 | Napau | B60R 22/201 |

* cited by examiner

SEAT BELT SUPPORT POINTS FORWARD AND BACKWARD ADJUSTMENT STRUCTURE

TECHNICAL FIELD

The present application relates to a three-point safety belt for an automobile seat, and in particular relates to a safety belt lower anchorage front-back adjustment structure.

BACKGROUND ART

The safety belt has continuously played a key role as one of the indispensable safety components of automobiles. The safety belt structure commonly used in automobiles is a three-point safety belt, which consists of a safety belt retractor, a safety belt guide outlet component, a buckle component, a lower anchor, safety belt webbing and a tongue. The safety belt retractor and the safety belt guide outlet component are fixedly mounted to a B-pillar of an automobile or being fixedly mounted at a shoulder position of a seat backrest, and the buckle component and the lower anchor are fixedly mounted at two sides of the automobile seat.

With the expansion of the automobile market, market competition is also increasingly fierce, and the requirements of customers for the quality, refinement and comfort of automobile products are also increasingly higher. The automobile seat is one of the components of vehicle contact and most frequent use, and the automobile seat acts as the first product of which the customer is aware. And as automobile market demands have changed, zero-gravity seats have emerged. A zero-gravity mode of the zero-gravity seat being: a front end of a seat frame being raised up, a backrest being tipped back, and a leg support being in a slightly inclined posture.

Zero-gravity seats realize multiple sitting posture modes for an occupant, such as a conventional sitting posture mode, a multi-angle sitting posture mode and a zero-gravity sitting posture mode; however, with fixed mounting of a conventional three-point safety belt lower anchorage (a buckle component and a lower anchor), as an angle of the seat is adjusted, an angle between the thighs and the upper body of the occupant also changes, with the result that the safety belt is in an unsafe wearing state and an uncomfortable wearing state. In addition, differences in body type between different occupants also cause the fixed safety belt to be in an unsafe wearing state and an uncomfortable wearing state.

SUMMARY

In view of this, the present application provides a safety belt lower anchorage front-back adjustment structure, for the purpose of enabling a safety belt, under different sitting posture modes, to provide an occupant with a more comfortable wearing experience, and achieve a good restraint effect on the occupant, increasing riding safety.

To achieve the above object, technical solutions of the present application are as follows:

A safety belt lower anchorage front-back adjustment structure may have a bottom base and a seat frame that is mounted on the bottom base. A support base that is respectively mounted on the bottom base at positions corresponding to a left side and a right side of the seat frame. A sliding component is provided on each support base. The two sliding components are able to slide forward and backward on the corresponding support base. A driving assembly is provided between the sliding component and the corresponding support base, used for driving the sliding component to slide forward and backward.

Among the two sliding components, a buckle is fixedly mounted on one sliding component, and a lower anchor is fixedly mounted on the other sliding component.

Using this structure, by means of the front-back motion of the sliding component driven by the driving assembly, front-back adjustment of the safety belt lower anchorage is realized, and such a structure has the advantages of a simple structure and high reliability. By means of adjusting the position of the safety belt lower anchorage, even for occupants with different body types and different seat modes, the safety belt can still ensure a good restraining effect on the occupant, and the occupant also has a good wearing experience.

Preferably, the support base comprises an inner support base and an outer support base that is fixedly mounted to an outer side of the inner support base by means of a screw, the inner support base being fixedly fitted to a side part of the bottom base. Using this structure, a mounting position of the bottom base is defined.

Preferably, a front end and a back end of the outer support base are provided with an outwardly bent support plate, two guide rods being fixedly mounted between two groups of the support plates. A front end and a back end of the sliding component are provided with an inwardly extending assembly plate. A sliding hole that slidably fits over the guide rod is provided on the assembly plate. Using this structure, a path of motion of the sliding component is defined.

Preferably, the driving assembly comprises an electric motor and a lead screw that is in motive power connection with an output shaft of the electric motor. The electric motor is fixedly fitted to an outer side of one of the support plates, and two ends of the lead screw are rotatably supported on the two support plates. Using this structure ensures a motive power source of the sliding component.

Preferably, the electric motor is a reduction motor, and an upper end of the lead screw is in motive power connection with an output end of the electric motor. Using this structure causes the structure of the motive power source to be simple.

Preferably, a bushing is fitted in the sliding hole. Using this structure makes the sliding component slide more smoothly on the guide rod.

Preferably, the sliding component is a linear sliding block. Using this structure, the type and manner of motion of the sliding component are defined.

Preferably, the driving assembly comprises an electric motor and a synchronous belt, a synchronous wheel being fitted over an output end of the electric motor, a directional wheel is provided on the support base. The synchronous belt is fitted over the synchronous wheel and the directional wheel, and the sliding component is fixedly mounted on the synchronous belt. Using this structure, the operation of the electric motors drives the synchronous belts to rotate, and the rotation of the synchronous belts drives front-back motion of the sliding components, thereby realizing front-back adjustment of the safety belt lower anchorage.

Preferably, the bottom base is provided with an angle adjuster electric motor for adjusting a tilt angle thereof, and the angle adjuster electric motor and the electric motor are synchronously controlled by means of a controller. Using this structure realizes synchronous adjustment of a seat angle and a safety belt lower anchorage (a buckle component and a lower anchor).

Preferably, the electric motor is a strip-shaped construction and is longitudinally mounted to an outer side of the support plate, a width of the electric motor not exceeding an outwardly bent length of the support plate. Using this structure does not increase the overall volume of the seat, such that the overall design is highly compact.

Compared with the prior art, beneficial effects of the present device and method are:

Using the safety belt lower anchorage front-back adjustment structure, front-back adjustment of a safety belt lower anchorage (a buckle component and a lower anchor) can be realized by means of the motion of sliding components driven by driving assemblies, ensuring that, for occupants of different body types and different seat angles, the safety belt always has an effective restraining effect on the occupant, and ensuring that the occupant has a comfortable safety belt wearing experience.

DETAILED DESCRIPTION

The device and method are further explained below in conjunction with the embodiments and accompanying drawings.

Figure 1:
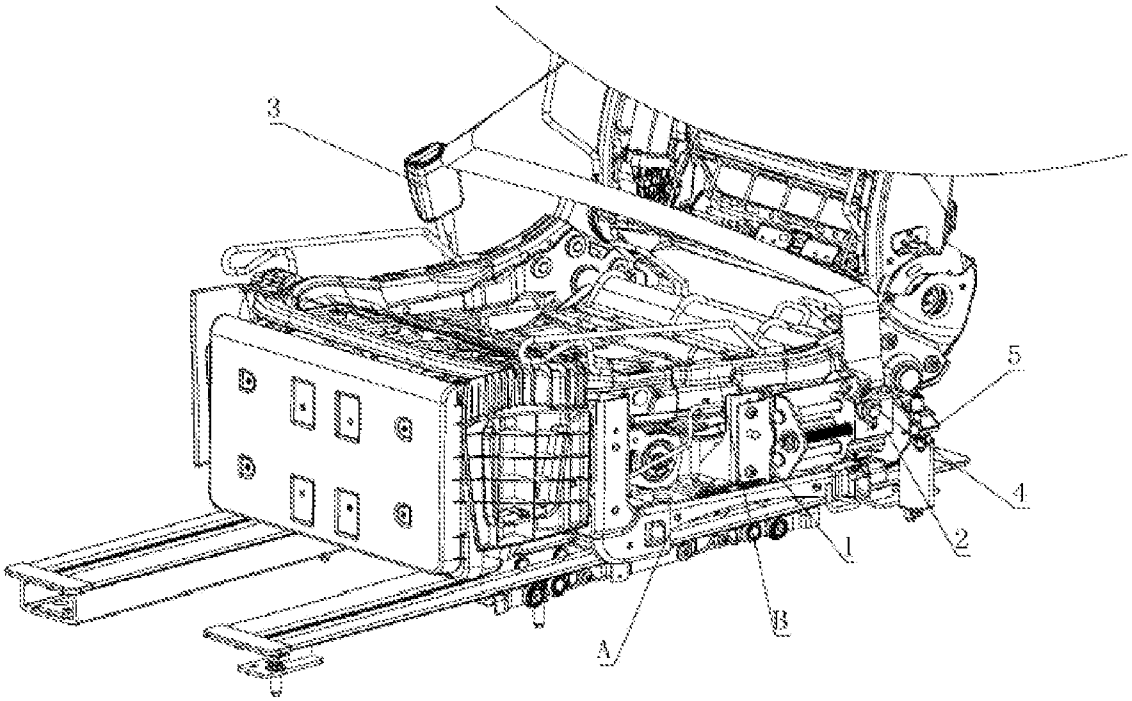
FIG. 1 is a structural schematic drawing of a seat (only showing a seat frame portion)

FIG. 1 shows a safety belt lower anchorage front-back adjustment structure, the structure comprising a bottom base A, a seat frame B and two support bases 1, and a back end of the bottom base A and a back end of the seat frame B being rotatably mounted. In the present embodiment, the two support bases 1 are symmetrically mounted at a left side and a right side of the bottom base A, and the safety belt lower anchorage front-back adjustment structure further comprises two sliding components 2. The two sliding components 2 are slidably mounted on the left and right support bases 1 in one-to-one correspondence in a front-back direction of the bottom base A. A buckle 3 and a lower anchor 4 are respectively fixedly provided on outer sides of the left and right sliding components 2. The buckle 3 is used for locking a safety belt. The lower anchor 4 is used for cooperating with the buckle 3 to restrain the waist of an occupant. A driving assembly 5 is mounted between the support base 1 and the sliding component 2. The driving assembly 5 being used for driving the sliding component 2 to move forward and backward. With such a design, front-back motion of the sliding components 2 achieves front-back adjustability of the safety belt lower anchorage. Such a structure has the advantages of structural simplicity and high reliability, and can adapt to groups with different body types, ensuring wearing comfort of the safety belt, and, when the seat performs multi-angle adjustment, the front-back adjustment of the safety belt lower anchorage can also ensure the safety belt always has a restraining effect on the occupant.

Figure 2:
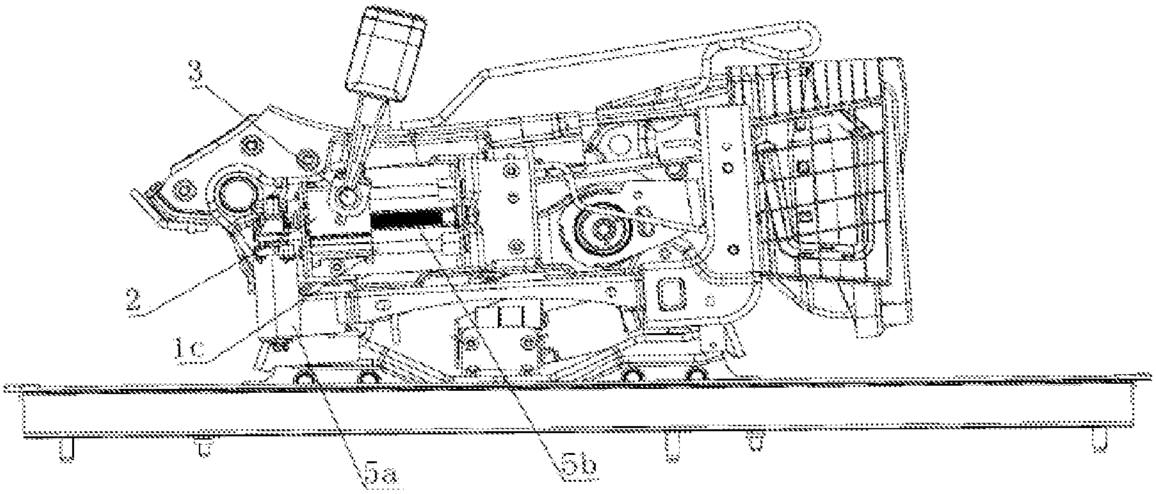
FIG. 2 is a right view of the seat (with a backrest made invisible)
Figure 3:
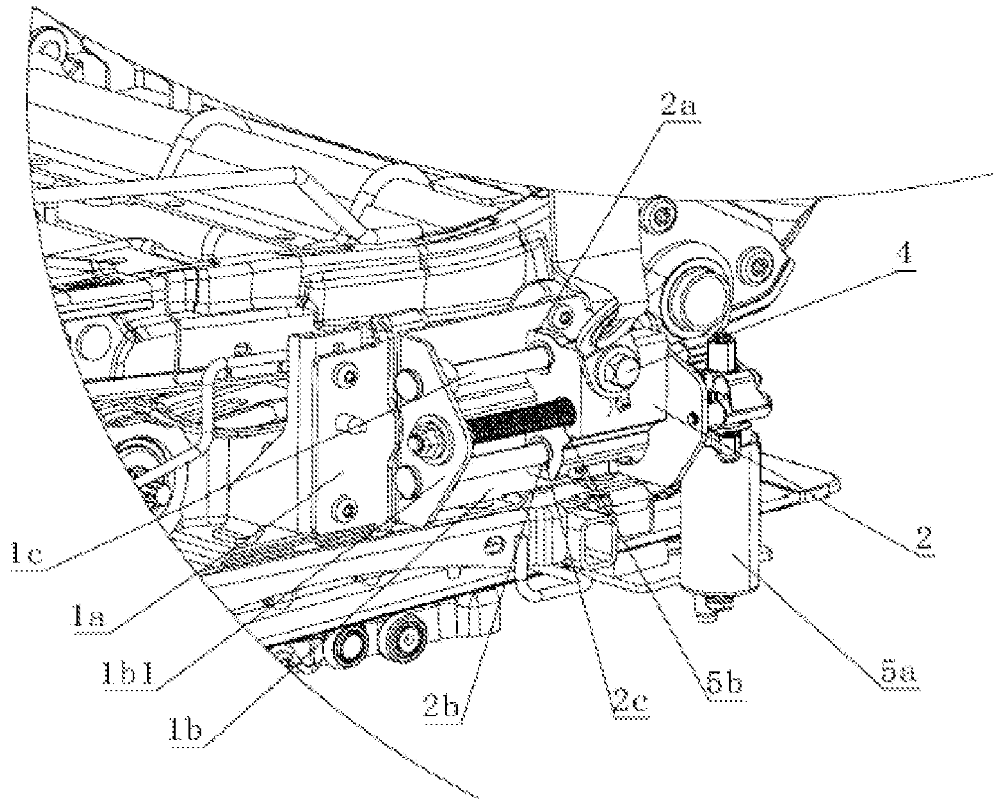
FIG. 3 is a partial schematic drawing of a safety belt lower anchorage (a lower anchor position)
Figure 4:
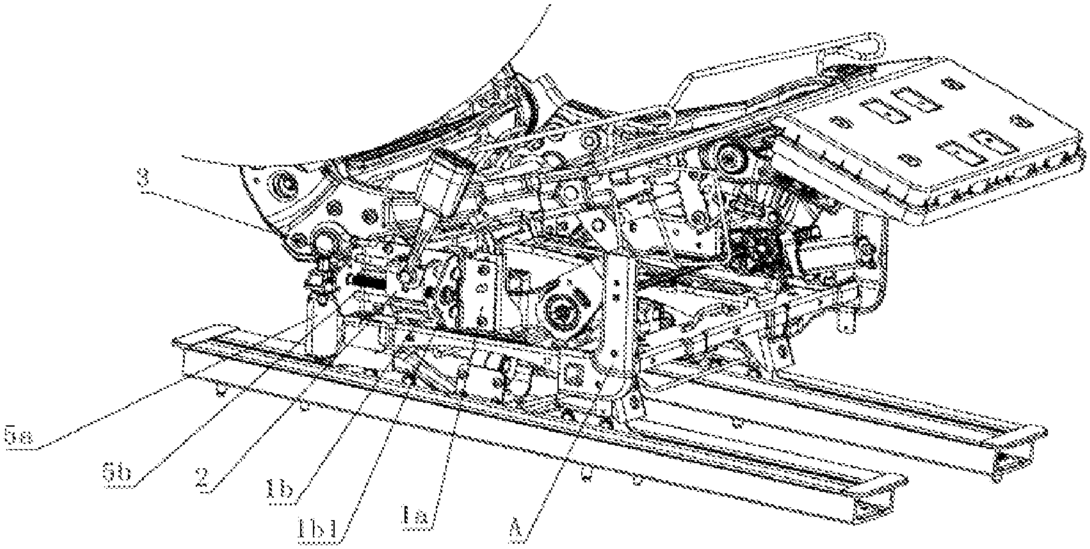
FIG. 4 is a structural schematic drawing of the lower anchorage of the seat in a zero-gravity mode (a buckle component side)

Further in conjunction with FIGS. 2, 3 and 4, in the present embodiment, the support base 1 comprises an inner support base 1*a* and an outer support base 1*b*. The inner support bases 1*a* are fixedly mounted to a left side and a right side of the bottom base A by means of bolts. Mounting positions of the left and right inner support bases 1*a* are symmetrical in a front-back direction of the bottom base A. The outer support base 1*b* are fixedly mounted to an outer side of the inner support base 1*a* by means of a bolt. A front end and a back end of the outer support base 1*b* are provided with an outwardly bent support plate 1*b*1, such that the outer support base 1*b* is overall a U-shaped structure. The two guide rods 1*c* are fixedly mounted between the front and back support plates 1*b*1. A front end and a back end of the sliding component 2 being provided with an assembly plate 2*a* that extends toward the bottom base A. A sliding hole 2*b* is provided on the assembly plate 2*a*. A bushing 2*c* is fitted in the sliding hole 2*b*. The sliding component 2 is slidably fitted over the guide rod 1*c* by means of the bushing 2*c*. With such a design, the sliding component 2 can be firmly fitted over the guide rod 1*c*, and the bushing 2*c* is used to make the sliding component 2 slide more smoothly.

Furthermore, in the present embodiment, the driving assembly 5 is composed of an electric motor 5*a* and a lead screw 5*b* that is in motive power connection with an output shaft of the electric motor 5*a*, the electric motor 5*a* being a strip-shaped reduction motor, the electric motor 5*a* being longitudinally fixedly mounted to an outer side of one of the support plates 1*b*1 of the outer support base 1*b* by means of a bolt. A width of the electric motor 5*a* does not exceed an outwardly bent length of the support plate 1*b*1. A front end and a back end of the lead screw 5*b* are rotatably supported between front and back support plates 1*b*1. One end of the lead screw 5*b* is in motive power connection with the output shaft of the electric motor 5*a*. The sliding component 2 is mounted to the lead screw 5*b* in a threaded manner. By means of programming, the left and right electric motors 5*a* and a seat angle adjuster electric motor perform synchronous adjustment using the same controller. With such a design, the operation of the electric motors 5*a* causes the lead screws 5*b* to rotate, and with the lead screws 5*b* fitted to the sliding components 2 in a threaded manner, the rotation of the lead screws 5*b* enables the sliding components 2 to move forward and backward, thereby achieving front-back adjustability of the safety belt lower anchorage (a buckle 3 and a lower anchor 4), and, while the seat angle adjuster electric motor operates, the electric motors 5*a* also operate, realizing synchronous adjustment of a seat angle with the safety belt buckle, and the longitudinal mounting of the electric motors 5*a* also does not increase the overall volume of the seat.

Figure 5:
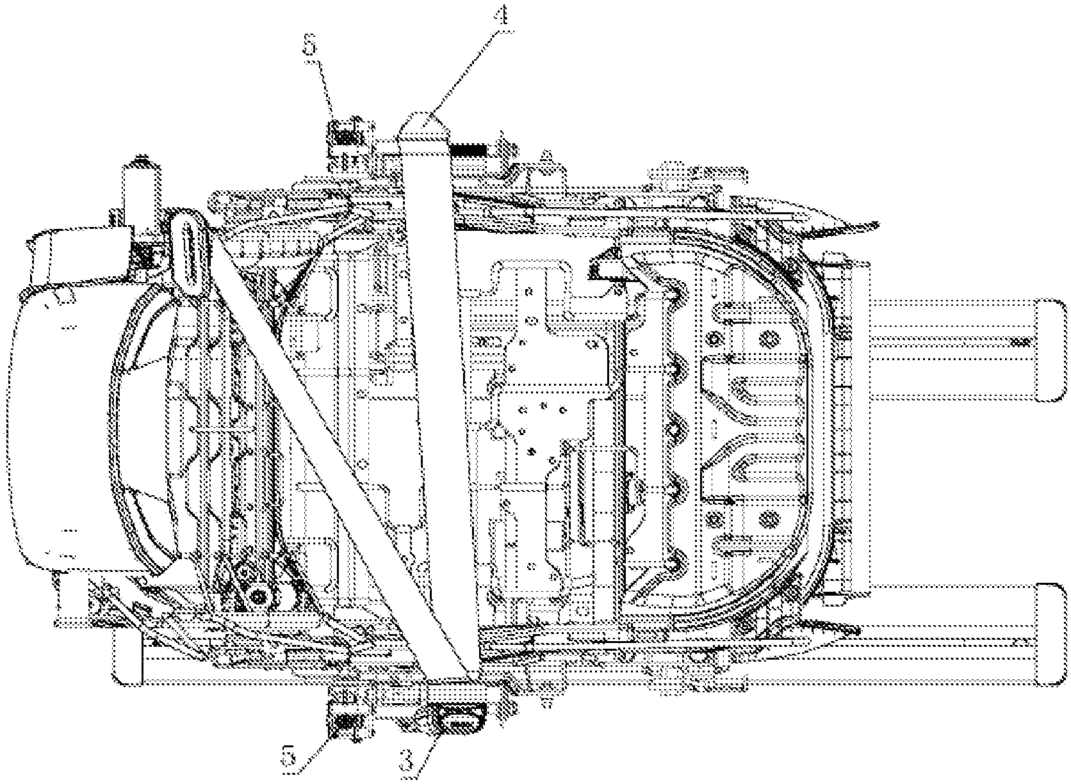
FIG. 5 is a top view of a seat (a normal sitting posture mode)

FIG. 5 shows a top view of the present utility model mounted on a seat, the buckle 3 and the lower anchor 4 being symmetrically mounted to the left side and the right side of the bottom base A, and an overall width of the driving assembly 5 not exceeding a width of the buckle 3 or the lower anchor 4 that rotates hidden in the sliding component 2. With such a design, the symmetrical mounting ensures that the safety belt and the waist position of the occupant are in a parallel state, which can restrain the occupant to a maximum extent, and the overall mounting structure also does not increase the space occupied by the seat, and the overall lower anchorage occupies a small proportion of the space.

Figure 6:
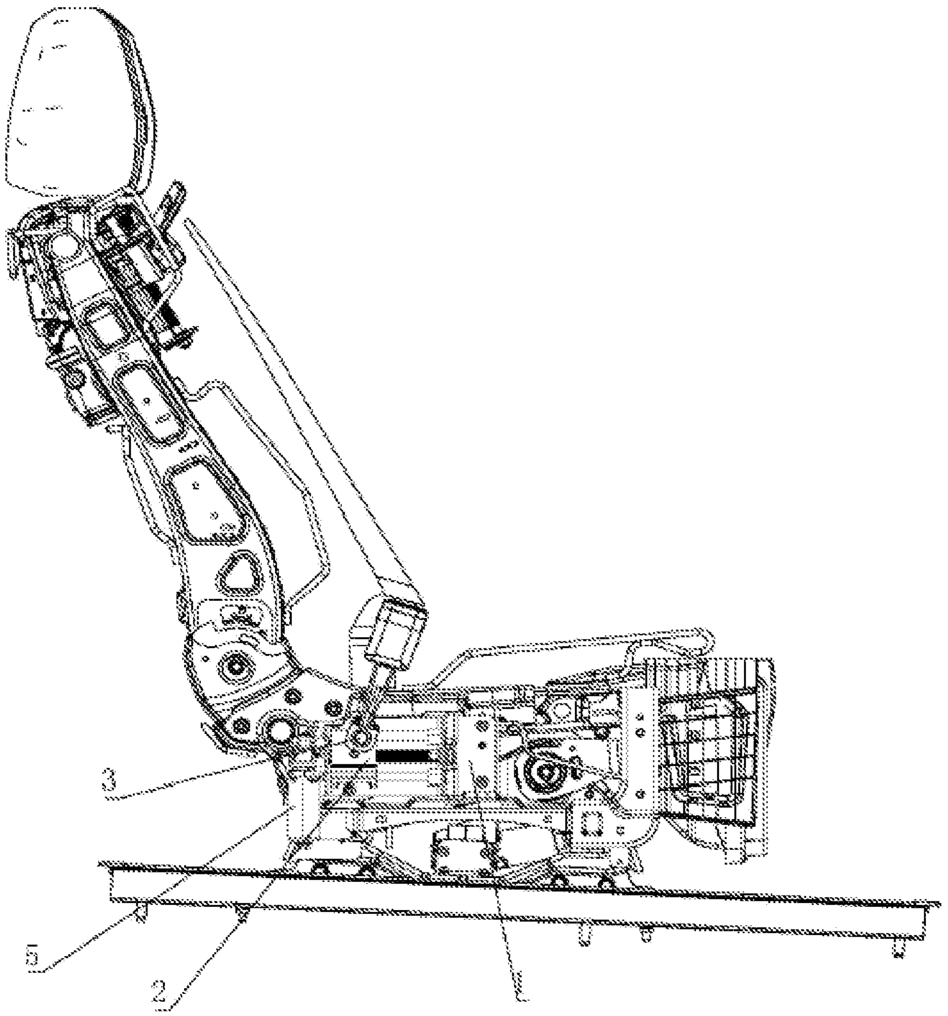
FIG. 6 is a left view of a seat (a normal sitting posture mode)
Figure 7:
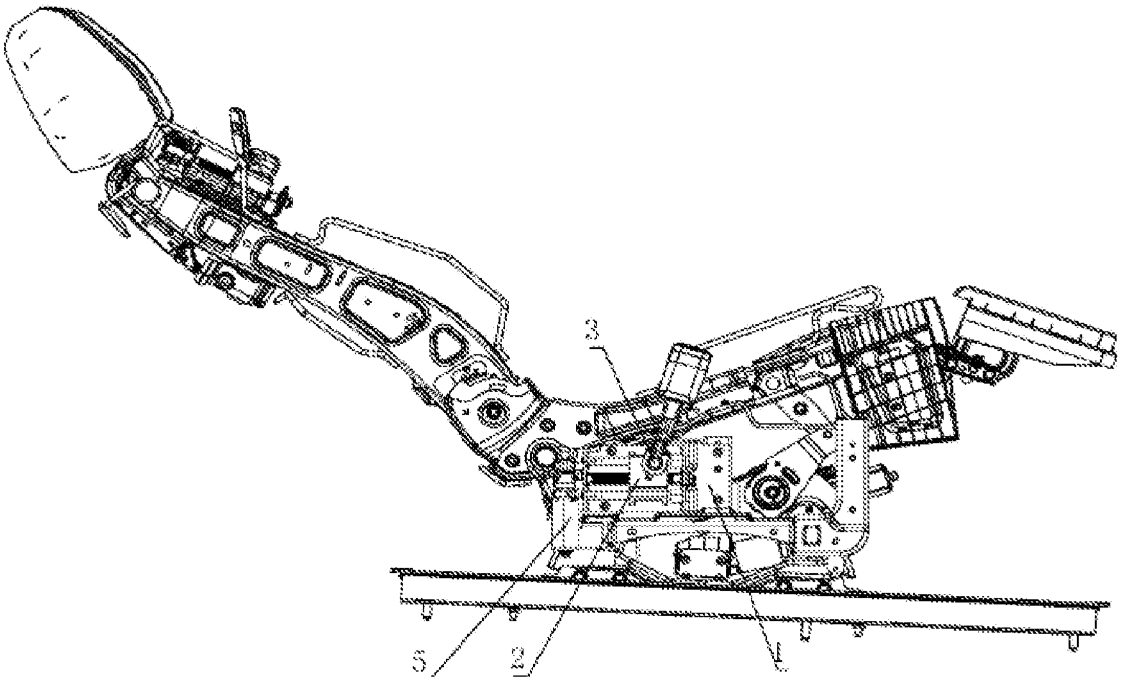
FIG. 7 is a left view of a seat (a zero-gravity sitting posture mode)

FIGS. 6 and 7 respectively show positions of the lower anchorage of the seat in a conventional mode and a zero-gravity mode, wherein only the positions of the buckle 3 in the different modes are shown because the buckle 3 and the lower anchor 4 are symmetrically mounted in a left-right direction. In the present embodiment, the electric motors 5*a* and the angle adjuster electric motor of the seat are synchronously controlled by means of a controller, so that the lower anchorage also moves forward as the angle of the seat frame B of the seat is increased. With such a design, the safety belt lower anchorage can also self-adaptively adjust when the seat switches between multiple modes.

Figure 8:
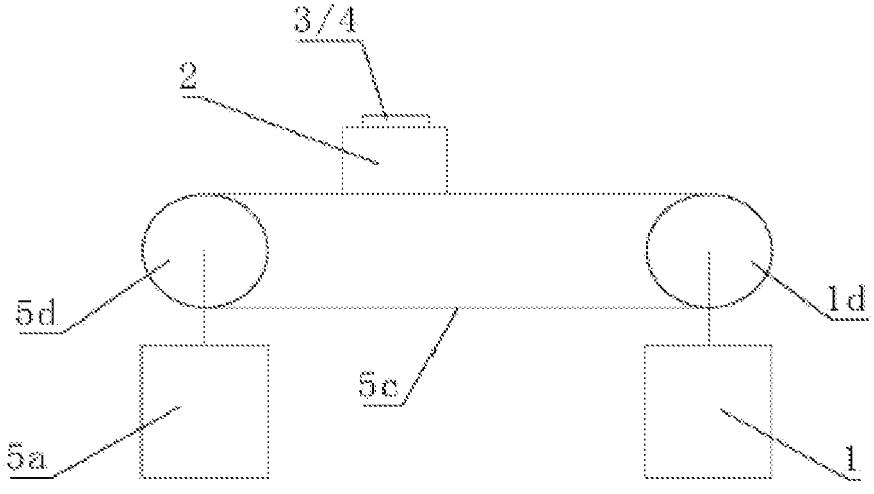
FIG. 8 is a schematic drawing of a structure of another embodiment of a driving assembly 5.

As shown in FIG. 8, in addition to the lead screw and electric motor driving means above, the driving assembly 5 may further be composed of an electric motor 5*a* and a synchronous belt 5*c*. A synchronous wheel 5*d* is fitted over an output end of the electric motor 5*a*. A directional wheel 1*d* is fixedly mounted on the support base 1. The synchronous belt 5*c* is fitted over the synchronous wheel 5*d* and the directional wheel 1*d*. The sliding component 2 is fixedly mounted on top of the synchronous belt. With such a design, the operation of the electric motors 5*a* drives the synchronous belts 4*c* to rotate by means of rotation of the synchronous wheels 5*d*, and the rotation of the synchronous belts 4*c* drives front-back motion of the sliding components 2, thereby achieving front-back adjustment of the safety belt lower anchorage (the buckle 3 and the lower anchor 4).

Finally, it must be explained that the above merely describes preferred embodiments; a person skilled in the art, having been enlightened by the foregoing may make various similar representations without going against the purpose of the present disclosure and the claims, all such changes falling within the scope of protection the claims.

What is claimed is:

1. A safety belt lower anchorage front-back adjustment structure, comprising: a bottom base and a seat frame that is mounted on the bottom base, a support base being respectively mounted on the bottom base at positions corresponding to a left side and a right side of the seat frame, a sliding component being provided on each said support base, two said sliding components being able to slide forward and backward on the corresponding support base, and a driving assembly being provided between the sliding component and the corresponding support base, used for driving the sliding component to slide forward and backward;

among two said sliding components, a buckle is fixedly mounted on one sliding component, and a lower anchor is fixedly mounted on the other sliding component, wherein the adjustment structure comprises at least one guide rod configured to guide movement of the sliding component relative to a support structure, wherein the sliding component is operatively engaged with the at least one guide rod.

2. The safety belt lower anchorage front-back adjustment structure as claimed in claim 1, wherein: the support base comprises an inner support base and an outer support base that is fixedly mounted to an outer side of the inner support base by means of a screw, the inner support base being fixedly fitted to a side part of the bottom base.

3. The safety belt lower anchorage front-back adjustment structure as claimed in claim 2, wherein: a front end and a back end of the outer support base are provided with an outwardly bent support plate, the at least one guide rod comprises two guide rods being fixedly mounted between the support plates, a front end and a back end of the sliding component being provided with an inwardly extending assembly plate, and a sliding hole that slidably fits over the at least one guide rod being provided on the assembly plate.

4. The safety belt lower anchorage front-back adjustment structure as claimed in claim 3, wherein: the driving assembly comprises an electric motor and a lead screw that is in motive power connection with an output shaft of the electric motor, the electric motor being fixedly fitted to an outer side of one of the support plates, and two ends of the lead screw being rotatably supported on two said support plates.

5. The safety belt lower anchorage front-back adjustment structure as claimed in claim 4, wherein: the electric motor is a reduction motor, and an upper end of the lead screw is in motive power connection with an output end of the electric motor.

6. The safety belt lower anchorage front-back adjustment structure as claimed in claim 4, wherein: the bottom base is provided with an angle adjuster electric motor for adjusting a tilt angle thereof, and the angle adjuster electric motor and the electric motor are synchronously controlled by means of a controller.

7. The safety belt lower anchorage front-back adjustment structure as claimed in claim 4, wherein: the electric motor is a strip-shaped construction and is longitudinally mounted on an outer side of the support plate, a width of the electric motor not exceeding an outwardly bent length of the support plate.

8. The safety belt lower anchorage front-back adjustment structure as claimed in claim 3, wherein: a bushing is fitted in the sliding hole.

9. The safety belt lower anchorage front-back adjustment structure as claimed in claim 3, wherein: the sliding component is a linear sliding block.

10. The safety belt lower anchorage front-back adjustment structure as claimed in claim 1, wherein: the driving assembly comprises an electric motor and a synchronous belt, a synchronous wheel being fitted over an output end of the electric motor, a directional wheel being provided on the support base, the synchronous belt being fitted over the synchronous wheel and the directional wheel, and the sliding component being fixedly mounted to one side of the synchronous belt.

11. A safety belt lower anchorage front-back adjustment structure, comprising:

a bottom base and a seat frame that is mounted on the bottom base, a support base being respectively mounted on the bottom base at positions corresponding to a left side and a right side of the seat frame, a sliding component being provided on each said support base, two said sliding components being able to slide forward and backward on the corresponding support base, and a driving assembly being provided between the sliding component and the corresponding support base, used for driving the sliding component to slide forward and backward;

among two said sliding components, a buckle is fixedly mounted on one sliding component, and a lower anchor is fixedly mounted on the other sliding component, wherein the support base comprises an inner support base and an outer support base that is fixedly mounted to an outer side of the inner support base by means of a screw, the inner support base being fixedly fitted to a side part of the bottom base, wherein a front end and a back end of the outer support base are provided with an outwardly bent support plate, two guide rods being fixedly mounted between the support plates, a front end and a back end of the sliding component being provided with an inwardly extending assembly plate, and a sliding hole that slidably fits over the guide rod being provided on the assembly plate.

12. A safety belt lower anchorage front-back adjustment structure, comprising:

a bottom base and a seat frame that is mounted on the bottom base, a support base being respectively mounted on the bottom base at positions corresponding to a left side and a right side of the seat frame, a sliding component being provided on each said support base, two said sliding components being able to slide forward and backward on the corresponding support base, and a driving assembly being provided between the sliding component and the corresponding support base, used for driving the sliding component to slide forward and backward;

among two said sliding components, a buckle is fixedly mounted on one sliding component, and a lower anchor is fixedly mounted on the other sliding component, wherein the driving assembly comprises an electric motor and a synchronous belt, a synchronous wheel being fitted over an output end of the electric motor, a directional wheel being provided on the support base, the synchronous belt being fitted over the synchronous wheel and the directional wheel, and the sliding component being fixedly mounted to one side of the synchronous belt.

* * * * *